(12) United States Patent
Miller et al.

(10) Patent No.: US 12,562,818 B2
(45) Date of Patent: Feb. 24, 2026

(54) POINTING, ACQUISITION, AND TRACKING SYSTEM FOR A MOBILE-PLATFORM OPTICAL COMMUNICATION SYSTEM

(71) Applicants: Eagle Technology, LLC, Melbourne, FL (US); Florida Atlantic University Board of Trustees, Boca Raton, FL (US)

(72) Inventors: Warner Allen Miller, Boca Raton, FL (US); Joseph Dodd, Palm Bay, FL (US); Michael Lange, Melbourne, FL (US); Christopher A. Corey, Palm Bay, FL (US)

(73) Assignees: Eagle Technology, LLC, Melbourne, FL (US); Florida Atlantic University Board of Trustees, Boca Raton, FL (US)

( * ) Notice: Subject to any disclaimer, the term of this patent is extended or adjusted under 35 U.S.C. 154(b) by 329 days.

(21) Appl. No.: 18/499,715

(22) Filed: Nov. 1, 2023

(65) Prior Publication Data

US 2025/0141564 A1 May 1, 2025

(51) Int. Cl.
| | |
|---|---|
| *H04B 10/11* | (2013.01) |
| *H04B 10/61* | (2013.01) |
| *H04B 10/70* | (2013.01) |

(52) U.S. Cl.
CPC ............. *H04B 10/70* (2013.01); *H04B 10/11* (2013.01); *H04B 10/61* (2013.01)

(58) Field of Classification Search
CPC ........................ H04B 10/11–118; H04B 10/70
See application file for complete search history.

(56) References Cited

U.S. PATENT DOCUMENTS

| | | | |
|---|---|---|---|
| 5,090,797 A | 2/1992 | Cleveland et al. | |
| 6,839,520 B1 * | 1/2005 | Dreischer | .......... H04B 7/18521 |
| | | | 398/121 |

(Continued)

FOREIGN PATENT DOCUMENTS

| | | | | |
|---|---|---|---|---|
| EP | 4440003 A1 * | 10/2024 | ........... | H04B 10/112 |
| WO | 2008076444 A1 | 6/2008 | | |

OTHER PUBLICATIONS

Jean-Philippe Bourgoin, et al., "Free-space quantum key distribution to a moving receiver", Optics express 23, No. 26, Dec. 2015, 11 pages.

(Continued)

*Primary Examiner* — Nathan M Cors
(74) *Attorney, Agent, or Firm* — Edell, Shapiro & Finnan, LLC

(57) ABSTRACT

An optical communication receiver system for a mobile platform includes: a surface having an entrance aperture for entry of an optical communication signal from a remote source; an optical receiver to receive the optical communication signal through the entrance aperture; a reflective layer over at least a portion of the surface to at least partially reflect an alignment beam that is substantially coincident with the optical communication signal; a camera positioned to detect the reflected alignment beam; a processor to determine alignment information about the alignment beam relative to the entrance aperture based on the reflected alignment beam detected by the camera; and a transmitter to transmit the alignment information to the remote source to enable the remote source to center the optical communication signal in the entrance aperture.

20 Claims, 6 Drawing Sheets

(56) References Cited

U.S. PATENT DOCUMENTS

| | | | |
|---|---|---|---|
| 10,826,609 B2 | 11/2020 | Cahoy et al. | |
| 11,258,514 B2 * | 2/2022 | Twichell | G02B 27/283 |
| 2009/0310784 A1 * | 12/2009 | Duligall | H04L 9/0852 |
| | | | 380/278 |
| 2012/0039617 A1 * | 2/2012 | Duligall | H04L 9/0858 |
| | | | 398/152 |
| 2018/0172915 A1 * | 6/2018 | Kim | H04B 10/1129 |
| 2023/0064750 A1 | 3/2023 | Izuhara et al. | |
| 2024/0162990 A1 * | 5/2024 | Raiteri | H04B 10/516 |

OTHER PUBLICATIONS

Hyunchae Chun, et al., "Motion-Compensated Handheld Quantum Key Distribution System", arXiv preprint arXiv:1608.07465, Aug. 2016, 8 pages.
Hua-Ying Liu, et al., "Drone-based entanglement distribution towards mobile quantum networks", Research Article, National Science Review, 0: Jan. 8, 2020, doi: 10.1093/nsr/nwz227, Jan. 3, 2020, 8 pages.
Alexandra DeCesare, et al., "Toward mobile free-space optical QKD: characterization of a polarization-based receiver", Proc. SPIE 11391, Quantum Information Science, Sensing, and Computation XII, 1139105 (May 26, 2020); doi: 10.1117/12.2567295, 11 pages.
Hua-Ying Liu, et al., "Supplementary Information for Optical-relayed entanglement distribution using drones as mobile nodes", Physical Review Letters 126, No. 2 (2021): 020503, 8 pages.
Hua-Ying Liu, et al., "Optical-Relayed Entanglement Distribution Using Drones as Mobile Nodes", Physical Review Letters 126, 020503 (2021), DOI: 10.1103/PhysRevLett.126.020503, 6 pages.
David Lowndes, et al., "A low cost, short range quantum key distribution system", Lowndes et al. EPJ Quantum Technology, ( 2021) 8:15, https://doi.org/10.1140/epjqt/s40507-021-00101-2, 16 pages.
Reham Abdelfatah, et al., "A review on pointing, acquisition, and tracking approaches in UAV-based fso communication systems", Optical and Quantum Electronics (2022) 54:571, https://doi.org/10.1007/s11082-022-03968-2, 16 pages.
Chengxiang Tu, et al., "A Lower Size, Weight Acquisition and Tracking System for Airborne Quantum Communication", IEEE Photonics Joyrnal, vol. 14, No. 6, Dec. 2022, 8 pages.
Christopher J. Pugh, et al., "Airborne demonstration of a quantum key distribution receiver payload", Quantum Science and Technology, Jun. 2017, 6;2(2):024009, 16 pages.

* cited by examiner

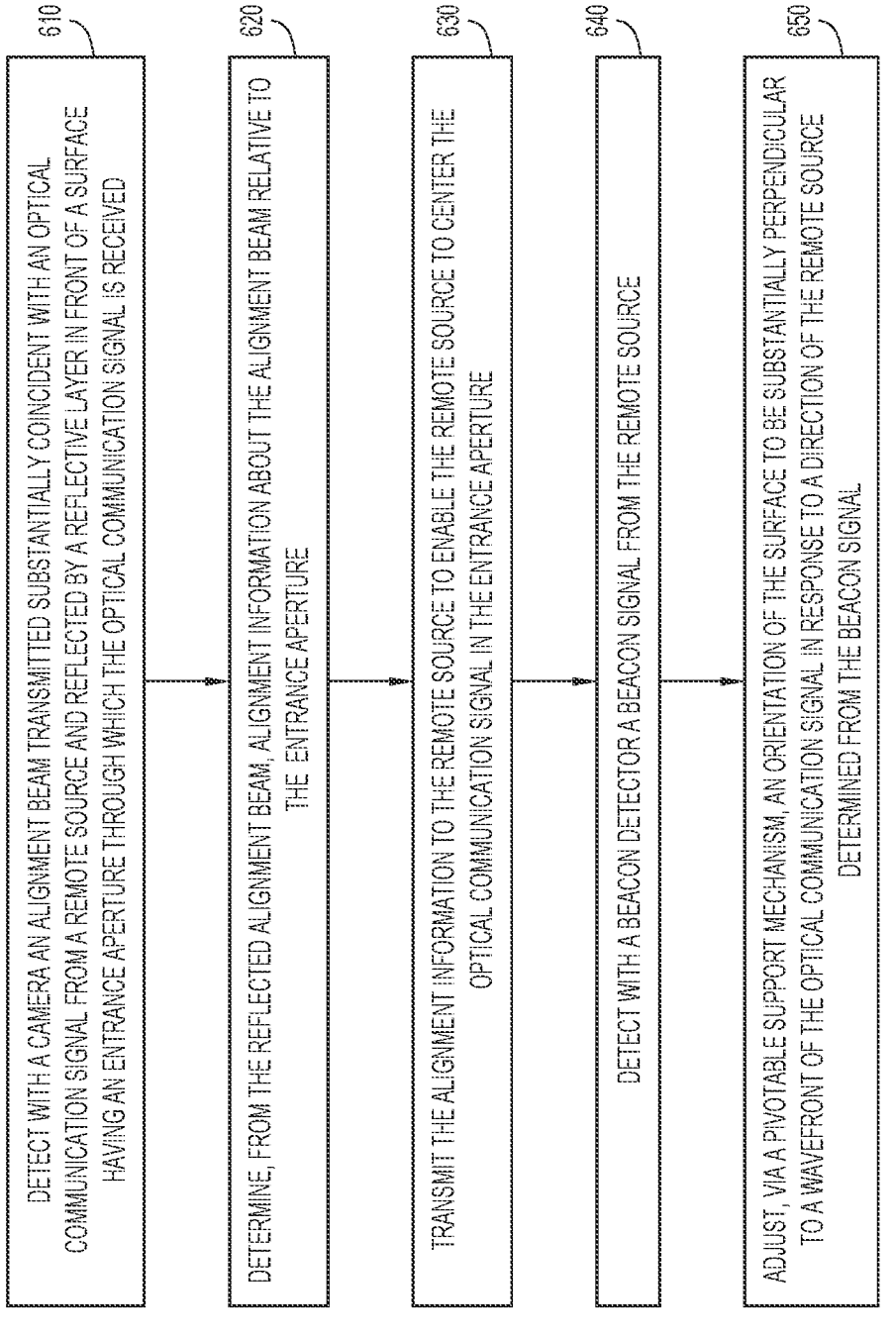

DETECT WITH A CAMERA AN ALIGNMENT BEAM TRANSMITTED SUBSTANTIALLY COINCIDENT WITH AN OPTICAL COMMUNICATION SIGNAL FROM A REMOTE SOURCE AND REFLECTED BY A REFLECTIVE LAYER IN FRONT OF A SURFACE HAVING AN ENTRANCE APERTURE THROUGH WHICH THE OPTICAL COMMUNICATION SIGNAL IS RECEIVED
610

DETERMINE, FROM THE REFLECTED ALIGNMENT BEAM, ALIGNMENT INFORMATION ABOUT THE ALIGNMENT BEAM RELATIVE TO THE ENTRANCE APERTURE
620

TRANSMIT THE ALIGNMENT INFORMATION TO THE REMOTE SOURCE TO ENABLE THE REMOTE SOURCE TO CENTER THE OPTICAL COMMUNICATION SIGNAL IN THE ENTRANCE APERTURE
630

DETECT WITH A BEACON DETECTOR A BEACON SIGNAL FROM THE REMOTE SOURCE
640

ADJUST, VIA A PIVOTABLE SUPPORT MECHANISM, AN ORIENTATION OF THE SURFACE TO BE SUBSTANTIALLY PERPENDICULAR TO A WAVEFRONT OF THE OPTICAL COMMUNICATION SIGNAL IN RESPONSE TO A DIRECTION OF THE REMOTE SOURCE DETERMINED FROM THE BEACON SIGNAL
650

FIG.6

POINTING, ACQUISITION, AND TRACKING SYSTEM FOR A MOBILE-PLATFORM OPTICAL COMMUNICATION SYSTEM

TECHNICAL FIELD

The present disclosure relates generally to a scheme for acquiring and tracking the position and orientation of an optical communication system on a mobile platform.

BACKGROUND

Quantum and classical free-space optical (FSO) communications from a transmitter to a receiver located on a mobile platform place stringent space, weight, and power (SWAP) and stability requirements on a pointing, acquisition, and tracking (PAT) system that facilitates line-of-sight optical communication between the transmitter and receiver. Changes in the orientation or position of the optical receiver resulting from motion of the mobile platform require the PAT system to make continual adjustments to ensure that the columnated laser light conveying the communication signals remains trained on the receiver optics.

One approach to establishing an FSO communication link on a lightweight, mobile platform involves using a closed-loop PAT system between a transmitter and receiver. Both the transmitter and receiver are gimbal mounted and each has a fast-steering mirror (FSM). The gimbals provide coarse alignment, while the FSMs provide fine alignment. Such an approach typically requires a radio frequency (RF) or WiFi communication link between the on-board computers of the transmitter and receiver. The requirement of the second FSM on the receiver, which controls the tip and tilt of the incoming wavefront, adds considerable weight and complexity to the receiver payload. Relative to existing approaches, it would be desirable to implement a less complex PAT system having lower SWAP requirements.

Light-weight, mobile platforms, such as a small, unmanned aerial vehicle (sUAV), ground rovers, robotics, balloons and the like, impose demanding SWAP requirements and necessitate a dynamic, closed-loop alignment system and the ability to operate in noisy, vibrational environments in order to maintain tightly stabilized alignment between the transmitter and receiver platforms. According to one non-limiting example context, it would be desirable for the PAT system to fit within no more than half the size of a commercial off-the-shelf (COTS) sUAV gimbal system (e.g., on the order of about 5,000 $cm^3$ in volume or less), weight less than about 1.5 kg, and use less than about 50 W of on-board power.

In terms of operation, such an example PAT system desirably would have the capability to establish a link between two mobile platforms with relative angular velocity less than about 10 deg/s and actively correct for vibrations on the order of about 100 Hz and should provide low loss due to weak coherent quantum entanglement sources in order to enable optical communication channels from a transmitter to a receiver that can be used to send quantum entangled states as well as classical optical signals.

BRIEF DESCRIPTION OF THE DRAWINGS

FIG. 6 is a flowchart of an example method of aligning an optical communication signal from a remote source with an optical receiver on a mobile platform.

DETAILED DESCRIPTION

Overview

Figure 1:
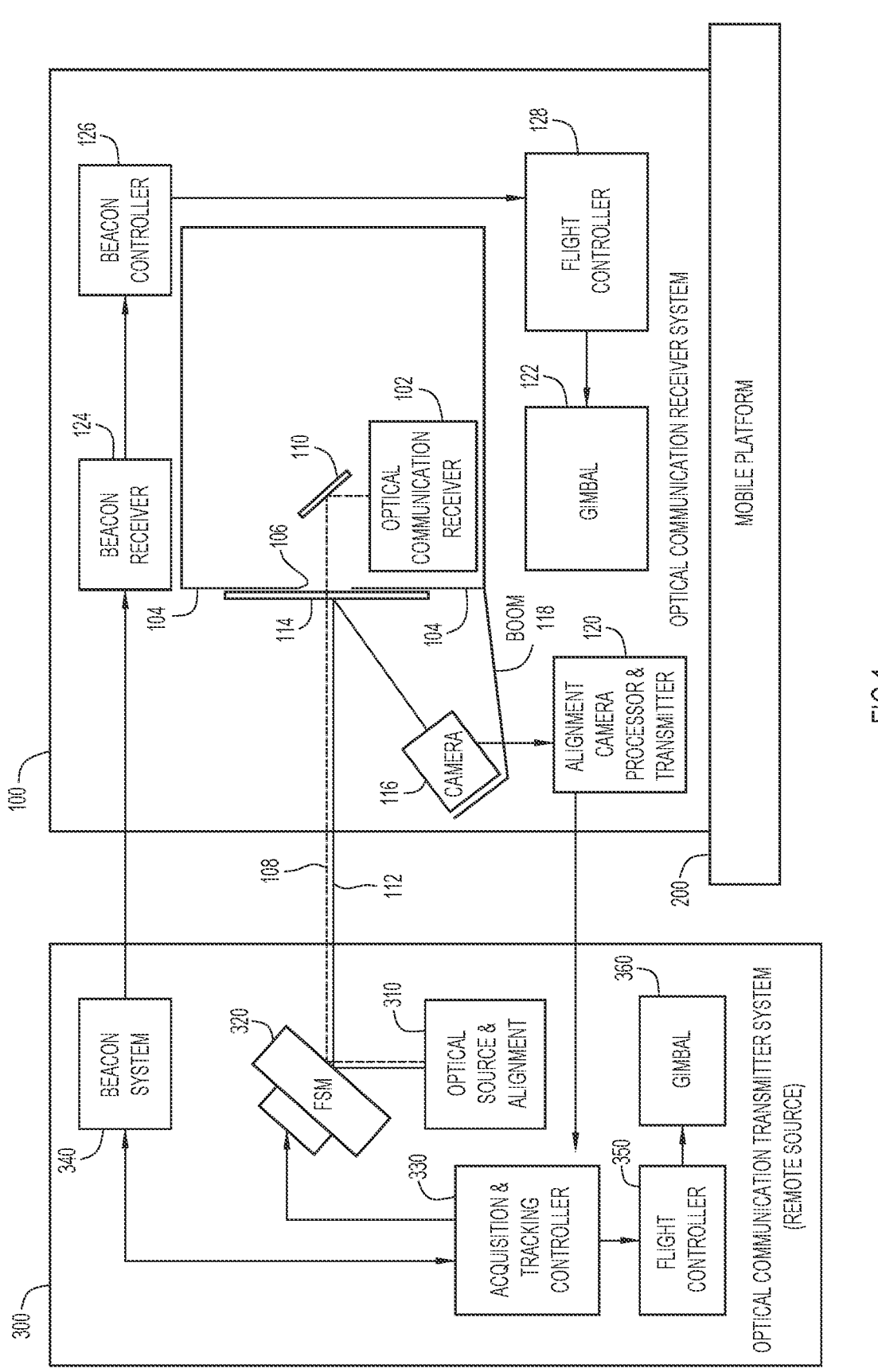
FIG. 1 is a functional block diagram of an optical communication receiver system including a pointing, acquisition, and tracking system according to the description herein.

In an embodiment, an optical communication receiver system, including a pointing, acquisition, and tracking system, comprises: a surface having an entrance aperture for entry of an optical communication signal from a remote source; an optical receiver to receive the optical communication signal through the entrance aperture; a reflective layer over (in front of) at least a portion of the surface, to at least partially reflect an alignment beam that is substantially coincident with the optical communication signal; a camera positioned to detect the reflected alignment beam; a processor to determine alignment information about the alignment beam relative to the entrance aperture based on the reflected alignment beam detected by the camera; and a transmitter to transmit the alignment information to the remote source to enable the remote source to center the optical communication signal in the entrance aperture.

Example Embodiments

The described pointing, acquisition, and tracking (PAT) system for an optical communication receiver system achieves a substantial reduction in complexity and in space, weight, and power (SWAP), making it well-suited for light-weight mobile platforms such as a small, unmanned aerial vehicle (sUAV). A significant feature of the described PAT system is the elimination of the need for a fast-steering mirror (FSM) on the receiver payload of a free-space optical (FSO) communication system. Both coarse and fine alignment of the FSO communication link can be performed and maintained with an FSM on only the transmitting platform without a second FSM in the receiver optics on the receiving mobile platform. A boom-mounted camera observers an alignment beam from the remote transmitting source, which is reflected from a forward-facing reflective layer over (in front of) a surface having an entrance aperture to the optical communication receiver. An onboard transmitter communicates with the remote transmitting optical system to drive the alignment beam towards the center of the receiver entrance aperture using the transmitters FSM. The receiver pointing, acquisition, and tracking system further observes a beacon signal from the remote transmitting source, and the received beacon information is used to control a gimbal to ensure that the surface having the entrance aperture is driven to be substantially perpendicular to the incoming communication and alignment beams from the remote transmitting source.

The primary optical communication channel can be implemented via a quantum communication link using a weak coherent source of entangled photon(s). The alignment beam can be coincident (colinear) with—and at a different wavelength than—the primary optical communication signal. Any portion of the alignment beam that is transmitted through the reflective layer can be separated from the primary optical communication signal behind the entrance aperture using a dichroic mirror. In this manner, a portion of the alignment beam optionally can be used as a secondary optical communication channel having a classical communication link that is co-apertured with the primary quantum communication link. Alternatively, or in addition, a portion of the alignment beam transmitted through the reflective layer can serve as a beacon signal that enables the tracking and acquisition system to drive the optical receiver system towards a perpendicular orientation with the incoming optical wavefront of the primary optical communication signal and the alignment signal. This architecture is capable of maintaining position and momentum (position and angle) variations within required limits to couple the optical beam(s) into multimode fibers. Owing primarily to the elimination of the fast-steering mirror (FSM) on the receiver platform, the space, weight, and power (SWAP) of the PAT system that can be achieved is almost an order of magnitude less than current sUAV PAT systems, with a weight capacity of less than one kilogram and a power usage of less than 50 Watts.

FIG. 1 is a block diagram of an example optical communication receiver system 100 including a pointing, acquisition, and tracking system according to the principles and concepts described herein. In the example shown, optical communication receiver system 100 is mounted on a mobile platform 200 and receives both a columnated laser optical communication signal 108 and a columnated laser alignment beam 112 from a remote optical communication transmitter system 300, also referred to generally as a "remote source" or "remote transmitting source." As used herein and in the claims the term "mobile platform" encompasses any platform capable of translational and/or rotational movement relative to a source transmitter, including terrestrial vehicles (e.g., manned vehicles, unmanned ground rovers, etc.) and other terrestrial portable or temporary mounting platforms, airborne and spaceborne platforms (e.g., fixed-wing manned and unmanned aircraft, balloons, satellites, and small unmanned aerial vehicles (sUAV) such as a small, quadcopter drone), and seaborne platforms (e.g., ships, buoys, and surface-located submarines). The ability of mobile platform 200 to change its position and/or orientation over time imposes the requirement on the optical communication system, including optical communication receiver system 100 and transmitter system 300, to continually adjust the direction of the transmitted optical signals and the orientation of the optical receiver as necessary to initially acquire the optical signals and to keep the optical signals trained on the optical receiver during communication (tracking).

Optical communication transmitter system 300 includes an optical source and alignment laser system 310 that generates both the optical communication signal 108 and the alignment beam 112, which are directed toward optical communication receiver system 100 by a fast-steering mirror (FSM) 320 controlled by an acquisition and tracking controller 330. Specifically, optical communication signal 108, which can be a quantum free-space optical (FSO) communication signal, is transmitted by optical communication transmitter system 300 as columnated laser light at a first optical wavelength, e.g., red light having a wavelength of approximately 810 nm. Quantum FSO communications involve a very weak coherent source of light relative to classical FSO communications. Whereas classical FSO communications can tolerate significant loss in the communication channel, the extremely low light intensity of quantum FSO communications (e.g., a photon count rate perhaps involving individual photons) and the resultant very low detector current demand a highly efficient communication channel and precise PAT to successfully operate under adverse conditions. Nevertheless, the described system is not limited to quantum FSO communications, and the optical communication signal 108 can be a quantum FSO communication signal or a classical FSO communication signal.

The alignment beam 112 is transmitted by optical communication transmitter system 300 as columnated laser light at a second optical wavelength that is different from the first optical wavelength of the optical communication signal 108. For example, the alignment beam 112 can be green light at a wavelength of 532 nm. Whereas optical communication signal 108 can be a quantum communication signal, alignment beam 112 is transmitted as a classical optical signal having an intensity much greater than that of a quantum communication signal. Optical communication transmitter system 300 transmits the alignment beam 112 via FSM 320 substantially coincident with the optical communication signal 108. As used herein, "substantially coincident" means coincident (traveling along the same line) or so close to coincident that any difference in the paths of the optical communication signal 108 and the alignment beam 112 are insignificant in terms of successfully detecting the optical communication signal 108 at optical communication receiver system 100. For ease of representation, the optical communication signal 108 and the alignment beam 112 are shown in the figures in parallel, side-by-side, instead of coincident.

Optical communication transmitter system 300 can itself be mounted on a mobile platform (not shown), in which case acquisition and tracking controller 330 may communicate with a main controller 350, which in the case of an airborne mobile platform can be a flight controller. To perform coarse alignment of the optical communication signal 108 and the alignment beam 112 with optical communication receiver system 100, main controller 350 controls a gimbal 360 to adjust the pan and tilt angles of optical communication transmitter system 300 based on the direction of optical communication receiver system 100, determined at least in part by beacon signal information received from optical communication receiver system 100 via a beacon system 340. While the example implementation shown in FIG. 1 shows an acquisition and tracking controller 330 and a separate flight controller 350, it will be appreciated that any controller configuration can be implemented that enables optical communication transmitter system 300 to control the orientation the optical communication signal 108 and alignment beam 112 relative to the direction of optical communication receiver system 100.

Still referring to FIG. 1, optical communication receiver system 100 includes an optical communication receiver 102 positioned behind a front panel or front surface 104, relative to a direction of incident optical signals transmitted from optical communication transmitter system 300. Optical communication receiver 102 is fixedly mounted or secured to front surface 104 or to a frame, enclosure, or mounting structure connected to front surface 104, such that optical communication receiver 102 remains in a fixed position relative to front surface 104. Optical communication receiver 102 can employ a large-core fiber and a relatively short focal length to provide a suitable degree of tolerance in the position and angle of the incidence to collect the light of optical communication signal 108. Front surface 104 has an entrance aperture 106 for entry of the optical communication signal 108 from optical communication transmitter system 300, which is received by optical communication receiver 102 behind front surface 104 through entrance aperture 106. Entrance aperture 106 can be located at or near the center of front surface 104 and can be, according to non-limiting examples, a symmetrical opening about a center of front surface 104, having a round, elliptical, square, or other polygonal shape.

Optical communication receiver 102 can be, for example, a quantum free-space optical communication ("Q-com") receiver though, as previously explained, the described system is not limited to quantum FSO communications, and the optical communication signal 108 received by optical communication receiver 102 can be a quantum FSO communication signal or a classical FSO communication signal. As shown in FIG. 1, to improve isolation, a dichroic mirror 110 reflective at the wavelength of optical communication signal 108 and transmissive to other wavelengths can be positioned behind entrance aperture 106 to reflect the optical communication signal 108 towards optical communication receiver 102, while other received wavelengths of light pass through dichroic mirror 110.

To successfully receive the optical communication signal 108 at the optical communication receiver 102, two primary requirements must be met. First, the optical communication signal 108 must be centered in entrance aperture 106. Second, front surface 104, which has a fixed position relative to optical communication receiver 102, must be oriented to be perpendicular to the wavefront of the optical communication signal 108. The first requirement is addressed by the PAT system of optical communication receiver system 100 by observing an offset of the alignment beam 112 transmitted by optical communication transmitter system 300 relative to the center of entrance aperture 106.

The PAT system of the optical communication receiver system 100 shown in FIG. 1 includes a reflective layer 114, which can be a diffuse reflective layer, in a path between the alignment beam 112 incoming from optical communication transmitter system 300 and entrance aperture 106. Specifically, reflective layer 114 is positioned over entrance aperture 106, i.e., in front of entrance aperture 106 in the direction of the incident alignment beam 112 arriving from optical communication transmitter system 300. Reflective layer 114 also covers (is positioned in front of) at least a portion of front surface 104 surrounding entrance aperture 106, if not covering substantially all of front surface 104. The incident reflective layer 114 at least partially reflects the incident alignment beam 112 towards a camera 116 positioned to detect the reflected alignment beam 112. Camera 116 can be, for example, a quad detector camera. With a diffuse reflective layer 114, at least some of the alignment beam 112 is reflected over a range of reflection angles, enabling camera 116 to be positioned anywhere within the reflection field to readily observe the reflected alignment beam 112.

Figure 2:
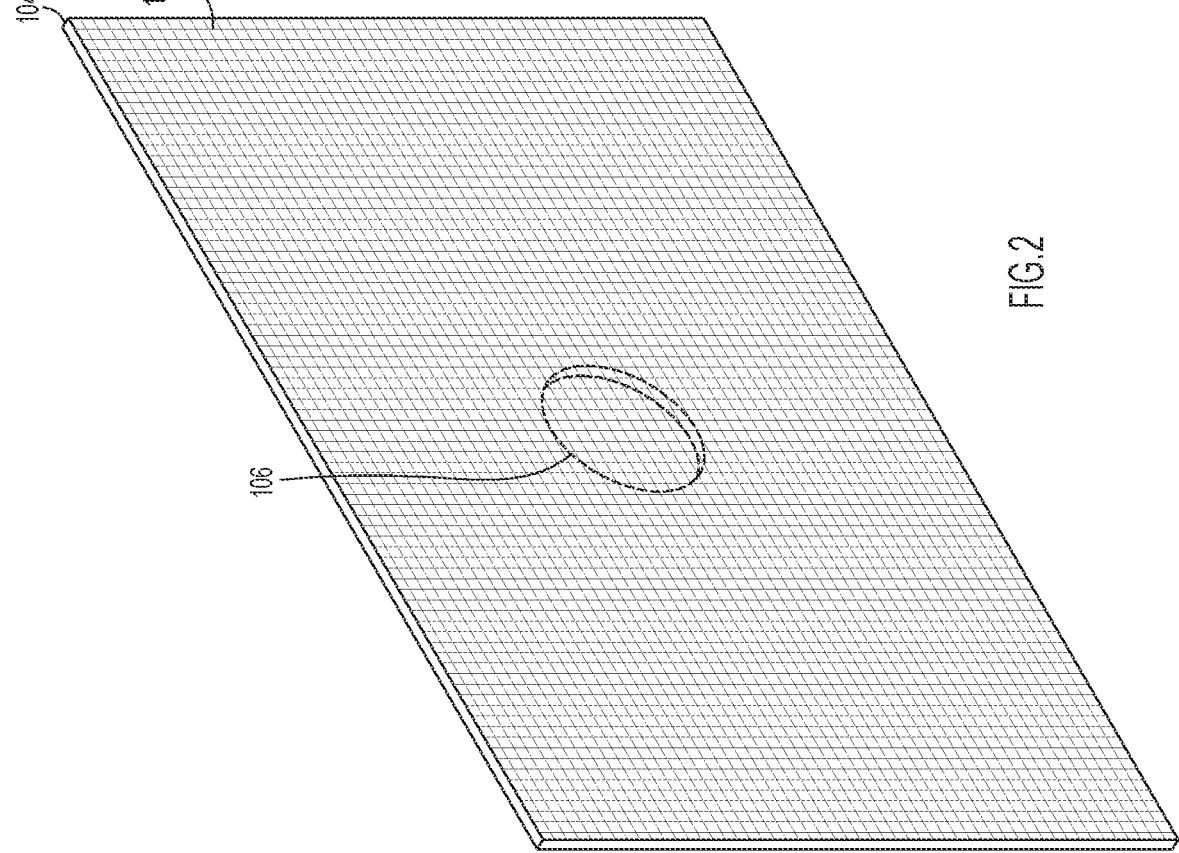
FIG. 2 is a diagram of a diffuse reflective layer over an entrance aperture in a front surface of the optical communication system of FIG. 1.

According to one implementation, reflective layer 114 can be a substantially flat or planar screen or mesh grid of light-reflective material that reflects the portion of incident light that impinges on the material of the screen, while transmitting the portion of incident light that passes through the openings in the grid of the screen. That is, the material of the screen or mesh grid intercepts and diffusely reflects some of the photons of incident light beams over a range of reflection angles, while other photons of incident light beams pass between the grid material and through entrance aperture 106 of front surface 104. A non-limiting example of this screen implementation of reflective layer 114 is shown in FIG. 2. One disadvantage of this implementation is that, along with reflecting a portion of the alignment beam 112, the screen also blocks a portion of the optical communication signal 108 from passing through entrance aperture 106 to optical communication receiver 102, thereby diminishing the signal power and bandwidth of the optical communication signal 108 somewhat. However, this screen implementation of reflective layer 114 reduces the necessary complexity of the lens of camera 116.

According to another implementation, reflective layer 114 can be a reflecting or partially reflecting film that reflects or partially reflects incident light at the wavelength of the alignment beam 112, while being substantially transparent (transmissive) at the wavelength of the optical communication signal 108 to enable the optical communication signal 108 to pass through entrance aperture 106 to optical communication receiver 102. Reflective layer 114 can include an anti-reflection coating that prevents reflection at the wavelength of the optical communication signal 108. To enable camera 116 to readily detect the reflected alignment beam 112, the reflecting film must direct at least some portion of the reflected alignment beam 112 in the direction of camera 116. This can be achieved with a diffuse reflecting film that scatters the reflected alignment beam 112 over an angular range of directions that encompass the position of camera 116 or by orienting the reflective film at a suitable angle relative to the incident alignment beam 112 and camera 116 to direct the reflected alignment beam 112 towards camera 116.

According to yet another implementation, reflection layer 114 can include a non-diffuse region (e.g., a non-reflective material or an opening or void) aligned with (over) entrance aperture 106 to minimize scattering loss of the optical communication signal 108 when maximum sensitivity is required. The non-diffuse region of the reflective layer can be implemented, for example, with specular material capable of filtering unwanted wavelengths without diminishing transmission at the wavelength of the optical communication signal 108. In the region surrounding entrance aperture 106, i.e., in front of front surface 104, reflective layer 114 comprises a reflective material, which can be a diffuse reflective material such as a screen or a diffusely reflective film as previously described. To enable the diffuse reflectivity region of reflective layer 114 around entrance aperture 106 to produce a reflection usable for centering the alignment beam 112 on entrance aperture 106, the alignment beam 112 in this case has an incident diameter greater than the diameter of entrance aperture 106. The resulting reflection of the alignment beam 112 has a "halo" or ring shape around a "hole" in the alignment beam reflection, the reflection "hole" being created by the non-reflective region of the reflective layer 114 that is aligned with entrance aperture 106. That is, the centration of the alignment beam 112 is readily observable by camera 116 based on the location of the non-reflection hole in the reflected alignment beam 112. Aligning the alignment beam 114 in this case involves making adjustments to center the "hole" in the alignment beam reflection. By way of a non-limiting example, entrance aperture can have a diameter of about 2.5 cm, and reflective layer 114 can have a diameter or maximum dimension of about 18 cm, so that an alignment beam have a diameter of about 4 to 5 cm at entrance aperture 106 would produce the necessary halo reflection.

In general, the implementation of reflective layer 114 is not limited to those specifically disclosed, and reflective layer 114 may be implemented using any materials and surface shapes (e.g., curved, paraboloid) so long as reflective layer 114 is capable of directing at least a portion of the reflected alignment beam 112 towards camera 116 while allowing most of the optical communication signal 108 to pass through entrance aperture 106 to optical communication receiver 102.

Camera 116 is mounted on a boom 118 that extends in front of front surface 104 such that camera 116 is positioned to detect the reflected alignment beam 112 to determine where on the reflective surface the alignment beam is impinging. The field of view (FOV) of camera 116 can be sufficiently wide to image the entirety of reflective layer 114, which can extend over the entirety of front surface 104 or at least a substantial portion thereof surrounding entrance aperture 106. In effect, camera 116 images where the "spot" of the alignment beam appears on reflective layer 114, e.g., relative to entrance aperture 106.

To ensure that the optical communication signal 108 is properly aligned, the coincident alignment beam 112 is required to be positioned in the center of the entrance aperture 106. Any offset of the position of the alignment beam relative to the center of the entrance aperture is measured and used to drive the alignment beam towards the center of entrance aperture 106. To achieve this result, camera 116 supplies image data to an alignment camera processor and transmitter system 120, which determines alignment information about the alignment beam 112 relative to entrance aperture 106 based on the reflected alignment beam detected by camera 116. For example, the processor of system 120 can compute coordinates in two dimensions of the alignment beam "spot" on reflective layer 114, e.g., offset coordinates relative to the center point of entrance aperture 106. According to one non-limiting approach, an "x-axis" coordinate measures the center position of the alignment beam spot along a left-right axis extending in the plane of reflective layer 114 through its center point, which is the point on reflective layer 114 aligned with the center point of entrance aperture 106 (e.g., an offset coordinate that is the difference between the alignment beam spot and the center point of reflective layer 114 along the x-axis), and a "y-axis" coordinate measures the center position of the alignment beam spot along an above-below axis extending in the plane of reflective layer 114 through its center point and perpendicular to the x-axis (e.g., an offset coordinate that is the difference between the alignment beam spot and the center point of reflective layer 114 along the y-axis). It will be appreciated that any of a number of possible mechanisms can be used to represent the location coordinates of the alignment beam on reflective layer 114, including other coordinate systems and reference frames without departing from the principles described herein.

System 120 further includes a transmitter that transmits the alignment information to acquisition and tracking controller 330 of optical communication transmitter system 300 to enable optical communication transmitter system 300 to center the alignment beam 112 and the optical communication signal 108 in entrance aperture 106. The transmitter can employ any suitable type of communication channel employing any of a variety of transmission protocols, such as a WiFi feedback channel transmitted via an RF wireless router or a classical optical channel. The remote acquisition and tracking controller 330 includes a receiver to receive the alignment information (e.g., offset coordinates) and a controller, such as a PID controller, that uses the alignment information to adjust FSM 320 to drive the alignment beam 112 and the optical communication signal 108 towards the center of entrance aperture 106 to minimize misalignment of the optical communication signal 108 with optical communication receiver 102. These operations are performed by camera 116, alignment camera processor and transmitter system 120, acquisition and tracking controller 330, and FSM 320 on an ongoing basis while a communication channel is being established and maintained between optical communication transmitter system 300 and optical communication receiver system 100 to support pointing, acquisition, and tracking.

Driving the FSM 320 of optical communication transmitter system 300 based on alignment beam coordinates detected by camera 116 accomplishes the first requirement for successfully receiving the optical communication signal 108 at optical communication receiver 102 by centering the optical communication signal 108 in entrance aperture 106. The second requirement for receiving the optical communication signal 108, i.e., orienting the front surface 104 of optical communication receiver system 100 to be perpendicular to the wavefront of the optical communication signal 108, is addressed using a beacon system to control a pivotable support mechanism 122, such as a gimbal, to adjust (rotate) the pan and tilt of optical communication receiver system 100 to drive the front surface 104 into a perpendicular orientation with the incident optical communication signal 108 based on the direction of the optical communication transmitter system 300 determine from a beacon signal.

In one implementation shown in FIG. 1, a beacon system 340 of optical communication transmitter system 300 transmits a beacon signal that is received by a beacon receiver 124 of optical communication receiver system 100. The beacon signal enables optical communication receiver system 100 to determine the direction of optical communication transmitter system 300. The beacon signal can be, for example, a light source (e.g., an LED) at a wavelength detectable by beacon receiver, which typically would not be collimated laser light to enable detection over a wide range of angles. Where the beacon signal is a light source, typically the light source would be at a different optical wavelength than the optical communication signal 108 to minimize interference. The beacon signal can also be an encoded optical or RF signal that conveys the position of optical communication transmitter system 300 to beacon receiver 124, e.g., by global navigation satellite system (GNSS) coordinates, such as differential GPS coordinates, to beacon receiver 124 via an RF or optical signal.

A beacon controller 126 determines the direction of optical communication transmitter system 300 from the beacon signal received by beacon receiver 124 and supplies this information to a main system controller. In the case where mobile platform 200 is an airborne platform such as an sUAV, the main system controller can a flight controller 128, as shown in FIG. 1. Based on the direction of optical communication transmitter system 300 determined from the beacon signal and the current orientation of the front surface 104 of optical communication receiver system 100, flight controller 128 determines the misalignment of the front surface 104 relative to a perpendicular orientation to the direction of the incident optical communication signal 108. Flight controller 128 controls pivotable support mechanism (e.g., a gimbal) 122 to adjust the pan and tilt angles of optical communication receiver system 100 based on the determined misalignment to drive the front surface 104 towards a perpendicular orientation with the optical communication signal 108. These operations are performed by beacon receiver 124, beacon controller 126, flight controller 128, and pivotable support mechanism 122 on an ongoing basis while a communication channel is being established and maintained between optical communication transmitter system 300 and optical communication receiver system 100 to support pointing, acquisition, and tracking. While the example implementation shown in FIG. 1 shows a beacon controller 126 and a separate flight controller 128, it will be appreciated that any controller configuration can be implemented that enables the PAT system to control, via a gimbal or the like, the orientation of optical communication receiver system 100 relative to the incident optical communication signal 108 based on the received beacon signal.

Notably, while optical communication receiver system 100 includes a camera to assist in alignment of the optical communication signal 108, optical communication receiver system 100 does not require a fast steering mirror (FSM). Driven by operational requirements for lower SWAP on a mobile platform such as an sUAV, the FSM can be dispensed with in the PAT of optical communication receiver system 100, because of the angular alignment provided by controlling pivotable support mechanism (gimbal) 122 based on the remote source's direction determined from the beacon signal. While the alignment from a gimbal is relatively coarse in comparison to the finer alignment achievable with a fast-steering mirror, the gimbal-based alignment is nevertheless sufficiently precise (e.g., within approximately 1 degree) to enable reception of quantum optical communication signals given the tolerances provided by the large-core fiber and relatively short focal length employed by optical communication receiver 102.

Moreover, an FSM is not required on the optical communication system mounted on mobile platform 200, because the described system is designed to support a one-way, receive-only FSO communication channel from a remote source (optical communication transmitter system 300) to the optical communication system mounted on mobile platform 200. That is, the optical communication system on mobile platform 200 is not required to transmit optical communication signals back to the remote source via a quantum FSO communication channel (which would in general require a local FSM). As used herein, a receive-only optical communication channel means that the optical communication system on a mobile platform receives optical communication signals on an optical communication channel but does not transmit optical communication signals on an optical communication channel to a remote device. Note that while a one-way, receive-only optical communication channel excludes a two-way optical communication channel (e.g., a two-way quantum FSO communication channel), it does not preclude transmission of other RF or optical signals from the PAT system of the optical communication receiver system to the remote source, such as transmission of the alignment beam offset information detected by the camera or beacon signals, as previously described. That is, the PAT system can use two-way communication to support acquisition and tracking, but the optical communication channel itself is a one-way communication channel, with at least the receiving end of the channel on a mobile platform. According to another option, the described implementation can support a two-way optical communication channel that is a classical FSO communication channel requiring less accuracy than is necessary for a quantum FSO communication channel. That is, two-way transmission and reception on an optical communication channel is feasible between two platforms with an FSM on only one of the platforms, provided the optical communication channel is a classical FSO communication channel.

A substantial reduction in weight results from the addition of a relatively light-weight camera and the elimination of an FSM, which includes heavy mirrors (e.g., piezo mirrors) as well as supporting structure and the complexity of moving parts, and the power and controller necessary to move them. In contrast to an FSM assembly, the described PAT architecture and optical communication receiver system include no moving components in an optical path of the optical communication signal, thereby reducing weight, cost, and complexity. Only the pivotable support mechanism (gimbal) is required to adjust the pan and tilt to align the optical communication receiver system with the optical communication signal wavefront. As a result, the PAT system can be contained within a volume of no more than 5,000 cm$^3$ and weigh less than 1.5 kg, while requiring less than about 50 watts of on-board power.

The described PAT system enables establishment of a link between two mobile platforms with a relative angular velocity less than 10 deg/s and actively correct for vibrations on the order of about 100 Hz to enable optical communication channels from a transmitter to a receiver that can be used to send quantum entangled states as well as classical optical signal. Meeting the aforementioned requirements permits a light-weight airborne platform, like an sUAV such as a quad-copter drone, to serve as a quantum node with ad hoc mobile network capabilities within an optical communication network.

Figure 3:
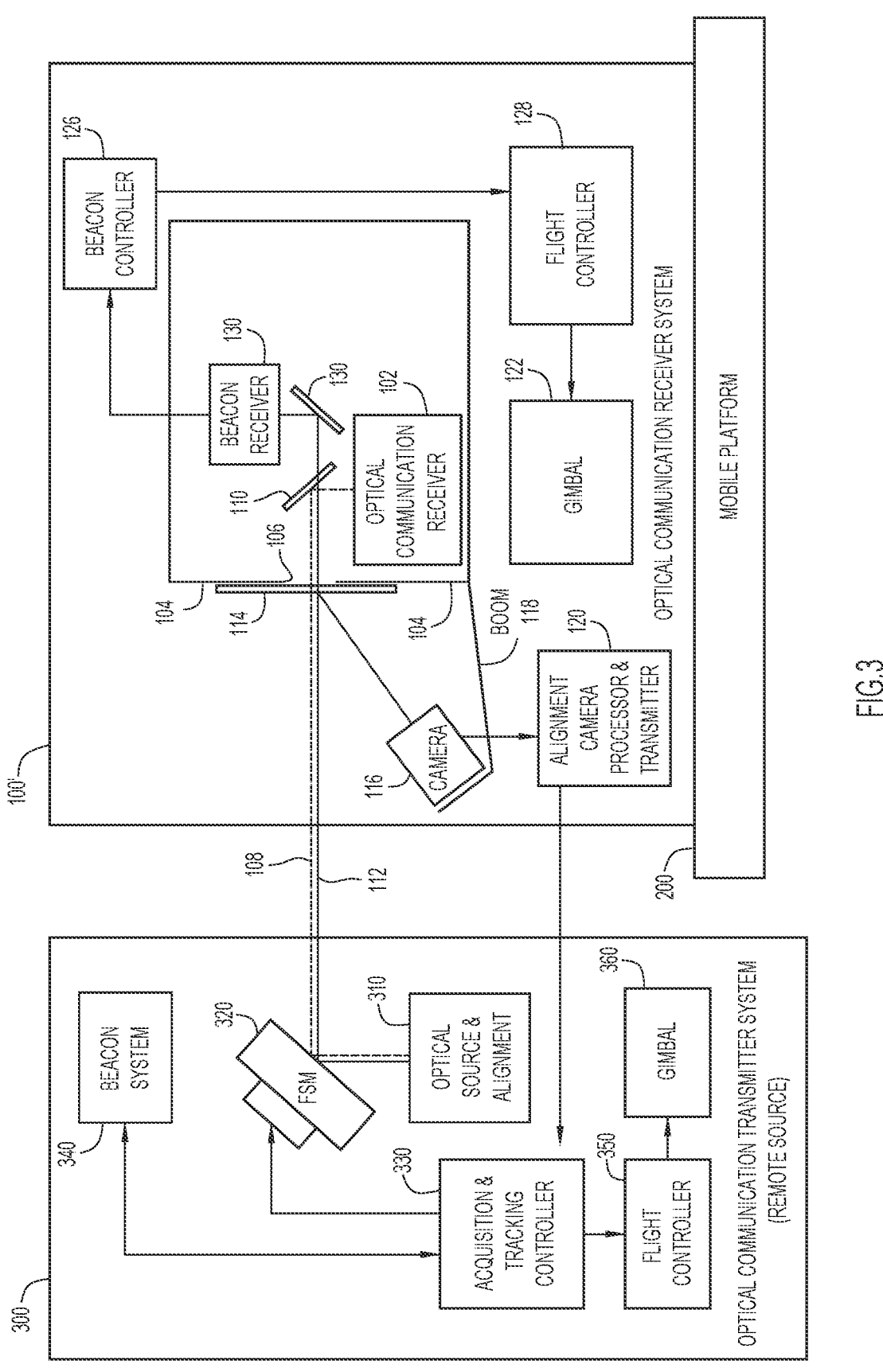
FIG. 3 is a functional block diagram of an optical communication receiver system described herein in which a beacon receiver is implemented by detecting a portion of an alignment beam from a remote source.

FIG. 3 is a functional block diagram of an optical communication receiver system 100' that is similar to optical communication receiver system 100 shown in FIG. 1 but with a different approach to the beacon receiver. The reference numerals used in FIG. 1 are also used in FIGS. 3-5 to denote components that are essentially the same. In the implementation shown in FIG. 3, a beacon receiver 130 is implemented by detecting a portion of the alignment beam 112 transmitted from optical communication transmitter system 300. Reflective layer 114 is partially transmissive at the wavelength of the alignment beam 112, such that a portion of the alignment beam 112 is reflected by reflective layer 114 and detectable by camera 116, while another portion of the alignment beam 112 passes through reflective layer 114 and entrance aperture 106. For example, as previously described in connection with FIGS. 1 and 2, reflective layer 114 can be a screen that reflects incident photons that impinge on the grid lines of the screen and transmits photons that pass between the grid lines of the screen. Alternatively, reflective layer 114 can be a partially reflective film at the wavelength of the alignment beam 112, as previously described. Dichroic mirror 110 is substantially transmissive (transparent) at the wavelength of the alignment beam 112 to allow the non-reflected portion of the alignment beam 112 to pass to beacon receiver 130.

Beacon receiver 130 can be a camera positioned behind front surface 104 to directly receive the non-reflected portion of the alignment beam 112, or a mirror 132 can be used to reflect the alignment beam 112 towards beacon receiver 130, as shown in FIG. 3. The non-reflected portion of the alignment beam 112 is used as beacon signal by beacon receiver 130 and beacon controller 126 to determine the direction of optical communication transmitter system 300, and this information is supplied to the main system controller, such as flight controller 128. For example, a detected offset of the beam in the camera's field of view relative to a center reference point can indicate an angular misalignment of the alignment beam 112 relative to a normal of front surface 104 at its center (i.e., an angular offset relative to a perpendicular direction at the center of entrance aperture 106). Based on the direction of optical communication transmitter system 300 determined from the beacon signal and the current orientation of the front surface 104 of optical communication receiver system 100, flight controller 128 determines the misalignment of the front surface 104 relative to a perpendicular orientation to the direction of the incident optical communication signal 108 and controls pivotable support mechanism (gimbal) 122 to adjust (rotate) the pan and tilt angles of optical communication receiver system 100 based on the determined misalignment to drive the front surface 104 towards a perpendicular orientation with the optical communication signal 108. Thus, in this implementation, the reflected portion of the received alignment beam 112 is used by the PAT system to position the alignment beam 112 and optical communication signal 108 in the center of entrance aperture 106, while the non-reflected portion of the alignment beam 112 is used to orient the front surface 104 of the optical communication receiver system 100 to be perpendicular to the wavefront of the optical communication signal 108.

Figure 4:
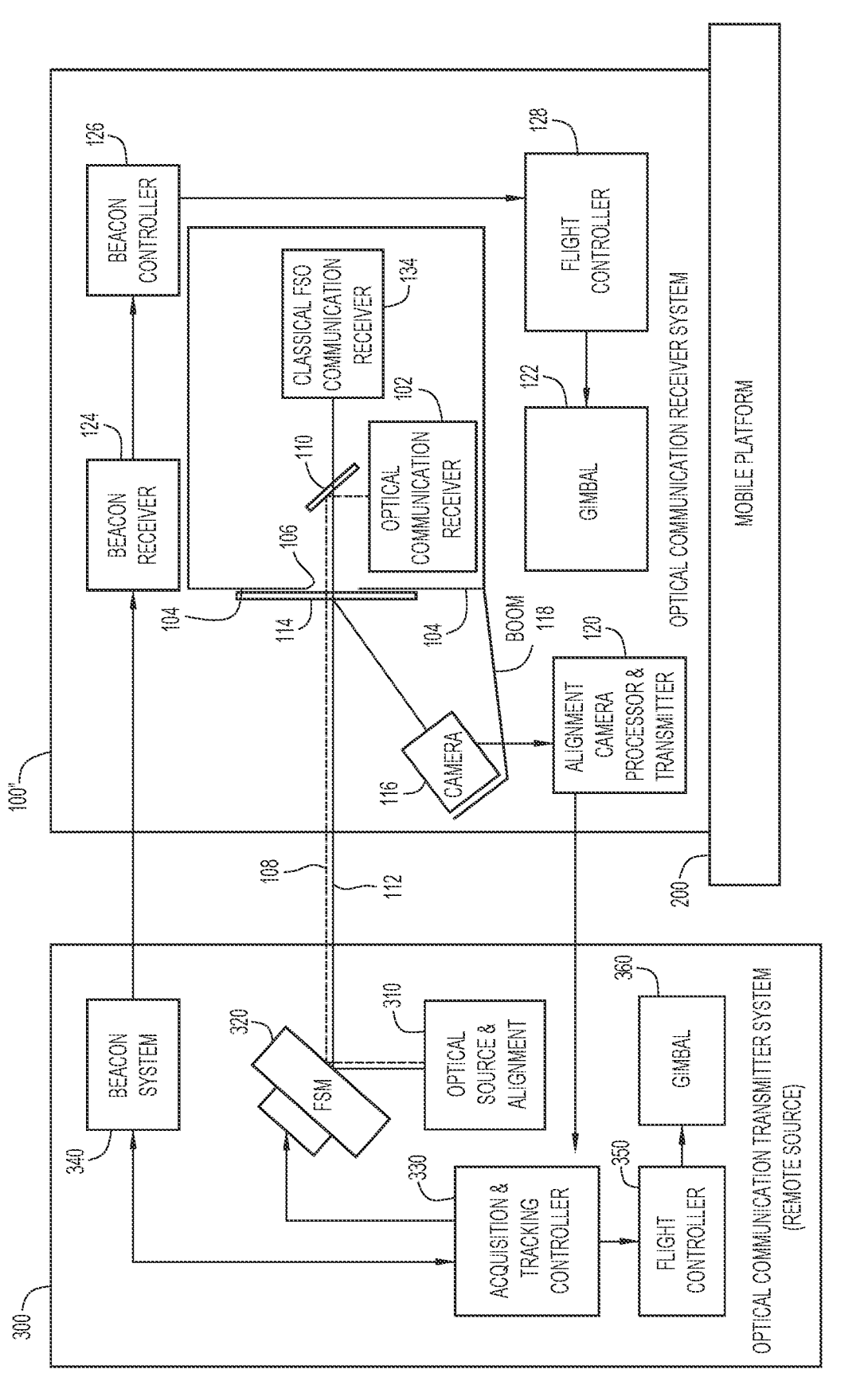
FIG. 4 is a functional block diagram of an optical communication receiver system described herein including a second optical receiver that establishes an optical communication channel using a portion of an alignment beam from a remote source.

FIG. 4 is a functional block diagram of an optical communication receiver system 100″ that is similar to optical communication receiver system 100 shown in FIG. 1, but where a non-reflected portion of the alignment beam 112 is used to provide a second FSO communication channel. As in the implementation shown in FIG. 3, reflective layer 114 is partially transmissive at the wavelength of the alignment beam 112, such that a portion of the alignment beam 112 is reflected by reflective layer 114 and detectable by camera 116, while another portion of the alignment beam 112 passes through reflective layer 114 and entrance aperture 106. Dichroic mirror 110 is substantially transmissive (transparent) at the wavelength of the alignment beam 112 to allow the non-reflected portion of the alignment beam 112 to pass to a second optical communication receiver 134. Unlike optical communication receiver 102, which can be implemented as a quantum FSO communication receiver, second optical communication receiver 134 is necessarily a classical FSO communication receiver, because the alignment beam 112 requires a sufficient intensity to be detectable by camera 116 to enable centering of the alignment beam 112 and the optical communication signal 108 in entrance aperture 106. The classical FSO communication channel received by second optical communication receiver 134 can be used to supplement the optical communication channel received by optical communication receiver 102, e.g., to convey different information that may not require the same level of security/non-detectability as that provided by a quantum FSO communication channel.

Figure 5:
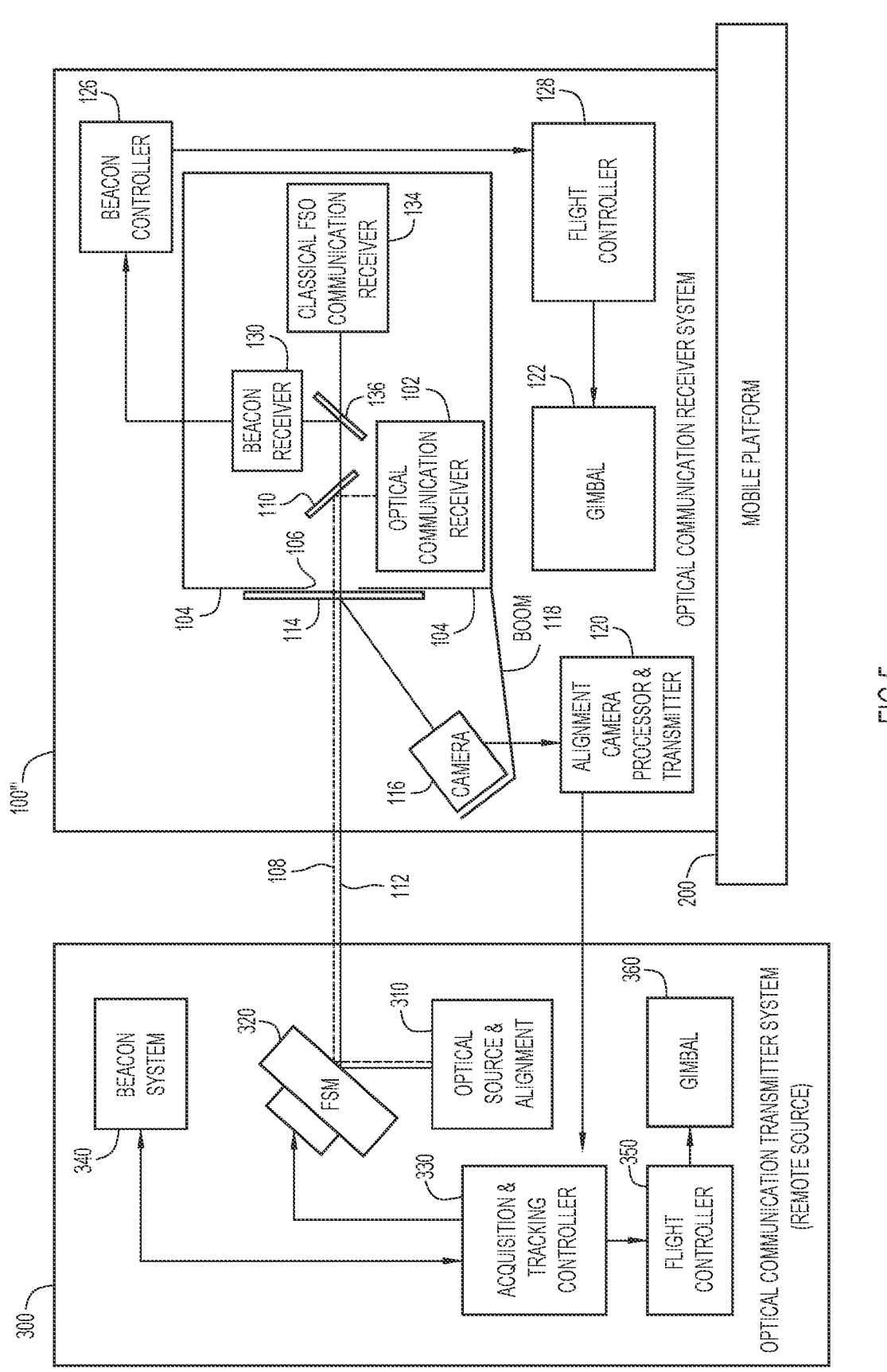
FIG. 5 is a functional block diagram of an optical communication receiver system described herein including both the beacon receiver implementation shown in FIG. 3 and the second optical receiver implementation shown in FIG. 4.

FIG. 5 is a functional block diagram of an optical communication receiver system 100″ that includes both the internal beacon receiver 130 shown in FIG. 3 and the second optical communication receiver 134 shown in FIG. 4. As in the implementation shown in FIGS. 3 and 4, reflective layer 114 is partially transmissive at the wavelength of the alignment beam 112, such that a portion of the alignment beam 112 is reflected by reflective layer 114 and detectable by camera 116, while another portion of the alignment beam 112 passes through reflective layer 114 and entrance aperture 106. Dichroic mirror 110 is substantially transmissive (transparent) at the wavelength of the alignment beam 112 to allow the non-reflected portion of the alignment beam 112 to pass to a beamsplitter 136, which reflects a portion of the alignment beam 112 towards beacon receiver 130 and transmits a portion of the alignment beam 112 to second optical communication receiver 134. In this configuration, the alignment beam 112 is ultimately split into three portions that are used for three different purposes: the portion of the alignment beam 112 reflected by reflective layer is used to center the incident optical signals in entrance aperture 106, the portion of the alignment beam 112 reflected to beacon receiver 130 is used to orient front surface 104 of optical communication receiver system 100′ to be perpendicular with the incident optical signals, and the portion of the alignment beam 112 passed to optical communication receiver 134 is used as a classical FSO communication signal.

FIG. 6 summarizes the operations performed by optical communication receiver system 100 to align an optical receiver on a mobile platform with an optical communication signal from a remote source such as optical communication transmitter system 300 in order to receive the optical communication signal through an entrance aperture in a surface. In operation 610, a camera detects an alignment beam from the remote source, transmitted substantially coincident with the optical communication signal, and reflected by a reflective layer in front of the surface. In operation 620, alignment information about the alignment beam relative to the entrance aperture is determined from the reflected alignment beam. In operation 630, the alignment information is transmitted to the remote source to enable the remote source to center the optical communication signal in the entrance aperture. In operation 640, a beacon detector detects a beacon signal from the remote source. In operation 650, a pivotable support mechanism adjusts an orientation of the surface to be substantially perpendicular to a wavefront of the optical communication signal in response to a direction of the remote source determined from the beacon signal.

In summary, in some aspects, the techniques described herein relate to an optical communication receiver system for a mobile platform, comprising: a surface having an entrance aperture for entry of an optical communication signal from a remote source; an optical receiver to receive the optical communication signal through the entrance aperture; a reflective layer over at least a portion of the surface to at least partially reflect an alignment beam that is substantially coincident with the optical communication signal; a camera positioned to detect the reflected alignment beam; a processor to determine alignment information about the alignment beam relative to the entrance aperture based on the reflected alignment beam detected by the camera; and a transmitter to transmit the alignment information to the remote source to enable the remote source to center the optical communication signal in the entrance aperture.

In some aspects, the techniques described herein relate to an optical communication receiver system, further comprising a pivotable support mechanism to adjust an orientation of the surface such that the entrance aperture is substantially perpendicular to a wavefront of the optical communication signal.

In some aspects, the techniques described herein relate to an optical communication receiver system, further comprising a beacon detector to detect a beacon signal from the remote source, wherein the pivotable support mechanism adjusts the orientation of the surface in response to a direction of the remote source determine from the beacon signal.

In some aspects, the techniques described herein relate to an optical communication receiver system, wherein the beacon detector is an optical detector positioned to receive a portion of the alignment beam transmitted through the reflective layer and entrance aperture.

In some aspects, the techniques described herein relate to an optical communication receiver system, wherein the pivotable support mechanism comprises a gimbal to rotate the surface relative to the mobile platform.

In some aspects, the techniques described herein relate to an optical communication receiver system, wherein the reflective layer is at least partially reflective at a first wavelength of the alignment beam and transmissive at a second wavelength of the optical communication signal, the second wavelength being different from the first wavelength.

In some aspects, the techniques described herein relate to an optical communication receiver system, wherein the optical receiver is a quantum free-space optical receiver to receive a quantum free-space optical communication signal.

In some aspects, the techniques described herein relate to an optical communication receiver system, wherein the alignment beam is a classical free-space communication signal and the reflective layer is partially transmissive at the second wavelength, the optical communication receiver system further comprising a second optical receiver to receive a portion of the alignment beam transmitted through the reflective layer and entrance aperture.

In some aspects, the techniques described herein relate to an optical communication receiver system, wherein the reflective layer is a mesh or screen.

In some aspects, the techniques described herein relate to an optical communication receiver system, wherein the optical communication receiver system does not include a fast steering mirror.

In some aspects, the techniques described herein relate to an optical communication receiver system, wherein the optical communication receiver system includes no moving components in an optical path of the optical communication signal.

In some aspects, the techniques described herein relate to an optical communication receiver system, wherein the optical communication receiver system supports a receive-only optical communication channel with the remote source.

In some aspects, the techniques described herein relate to an optical communication receiver system, further comprising a boom on which the camera is mounted.

In some aspects, the techniques described herein relate to a pointing, acquisition, and tracking system, comprising: a reflective layer in an optical path between a remote source and a surface having an entrance aperture through which an optical communication signal from the remote source is receivable by an optical receiver, the reflective layer being at least partially reflective to an alignment beam from the remote source that is substantially coincident with the optical communication signal; a camera positioned to detect the alignment beam reflected by the reflective layer; a processor to determine alignment information about the alignment beam relative to the entrance aperture based on the alignment beam detected by the camera; a transmitter to transmit the alignment information to the remote source to enable the remote source to center the optical communication signal in the entrance aperture; a beacon detector to detect a beacon signal from the remote source; and a pivotable support mechanism to adjust an orientation of the surface to be substantially perpendicular to a wavefront of the optical communication signal in response to a direction of the remote source determined from the beacon signal.

In some aspects, the techniques described herein relate to a pointing, acquisition, and tracking system, wherein the beacon detector is an optical detector positioned to receive a portion of the alignment beam transmitted through the reflective layer and entrance aperture.

In some aspects, the techniques described herein relate to a pointing, acquisition, and tracking system, wherein the reflective layer is partially transmissive to the alignment beam, the pointing, acquisition, and tracking system further comprises a second optical receiver to receive a portion of the alignment beam transmitted through the reflective layer.

In some aspects, the techniques described herein relate to a pointing, acquisition, and tracking system, wherein the second optical receiver is the beacon detector.

In some aspects, the techniques described herein relate to a pointing, acquisition, and tracking system, wherein the pointing, acquisition, and tracking system does not include a fast steering mirror or any moving components in an optical path of the optical communication signal.

In some aspects, the techniques described herein relate to a method of aligning an optical communication signal from a remote source with an optical receiver on a mobile platform to receive the optical communication signal through an entrance aperture in a surface, the method comprising: detecting with a camera an alignment beam from the remote source, substantially coincident with the optical communication signal, and reflected by a reflective layer in front of the surface; determining, from the reflected alignment beam, alignment information about the alignment beam relative to the entrance aperture; and transmitting the alignment information to the remote source to enable the remote source to center the optical communication signal in the entrance aperture.

In some aspects, the techniques described herein relate to a method further comprising detecting with a beacon detector a beacon signal from the remote source; and adjusting, via a pivotable support mechanism, an orientation of the surface to be substantially perpendicular to a wavefront of the optical communication signal in response to a direction of the remote source determined from the beacon signal.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An optical communication receiver system for a mobile platform, comprising:
   a surface having an entrance aperture for entry of an optical communication signal from a remote source;
   an optical receiver to receive the optical communication signal through the entrance aperture;
   a reflective layer over at least a portion of the surface to at least partially reflect an alignment beam that is substantially coincident with the optical communication signal;
   a camera positioned to detect the reflected alignment beam;
   a processor to determine alignment information about the alignment beam relative to the entrance aperture based on the reflected alignment beam detected by the camera; and
   a transmitter to transmit the alignment information to the remote source to enable the remote source to center the optical communication signal in the entrance aperture.

2. The optical communication receiver system of claim 1, further comprising:

a pivotable support mechanism to adjust an orientation of the surface such that the entrance aperture is substantially perpendicular to a wavefront of the optical communication signal.

3. The optical communication receiver system of claim 2, further comprising a beacon detector to detect a beacon signal from the remote source, wherein the pivotable support mechanism adjusts the orientation of the surface based on a direction of the remote source determine from the beacon signal.

4. The optical communication receiver system of claim 3, wherein the beacon detector is an optical detector positioned to receive a portion of the alignment beam transmitted through the reflective layer and the entrance aperture.

5. The optical communication receiver system of claim 2, wherein the pivotable support mechanism comprises a gimbal to rotate the surface relative to the mobile platform.

6. The optical communication receiver system of claim 1, wherein the reflective layer is at least partially reflective at a first wavelength of the alignment beam and transmissive at a second wavelength of the optical communication signal, the second wavelength being different from the first wavelength.

7. The optical communication receiver system of claim 6, wherein the optical receiver is a quantum free-space optical receiver to receive a quantum free-space optical communication signal.

8. The optical communication receiver system of claim 6, wherein the alignment beam is a classical free-space communication signal and the reflective layer is partially transmissive at the second wavelength, the optical communication receiver system further comprising a second optical receiver to receive a portion of the alignment beam transmitted through the reflective layer and the entrance aperture.

9. The optical communication receiver system of claim 1, wherein the reflective layer is a diffuse reflective layer.

10. The optical communication receiver system of claim 1, wherein the optical communication receiver system does not include a fast steering mirror.

11. The optical communication receiver system of claim 1, wherein the optical communication receiver system includes no moving components in an optical path of the optical communication signal.

12. The optical communication receiver system of claim 1, wherein the optical communication receiver system supports a receive-only optical communication channel with the remote source.

13. The optical communication receiver system of claim 1, further comprising a boom on which the camera is mounted.

14. A pointing, acquisition, and tracking system, comprising:

a reflective layer in an optical path between a remote source and a surface having an entrance aperture through which an optical communication signal from the remote source is receivable by an optical receiver, the reflective layer being at least partially reflective to an alignment beam from the remote source that is substantially coincident with the optical communication signal;

a camera positioned to detect the alignment beam reflected by the reflective layer;

a processor to determine alignment information about the alignment beam relative to the entrance aperture based on the alignment beam detected by the camera;

a transmitter to transmit the alignment information to the remote source to enable the remote source to center the optical communication signal in the entrance aperture;

a beacon detector to detect a beacon signal from the remote source; and a pivotable support mechanism to adjust an orientation of the surface to be substantially perpendicular to a wavefront of the optical communication signal based on a direction of the remote source determined from the beacon signal.

15. The pointing, acquisition, and tracking system of claim 14, wherein the beacon detector is an optical detector positioned to receive a portion of the alignment beam transmitted through the reflective layer and entrance aperture.

16. The pointing, acquisition, and tracking system of claim 14, wherein the reflective layer is partially transmissive to the alignment beam, the pointing, acquisition, and tracking system further comprises a second optical receiver to receive a portion of the alignment beam transmitted through the reflective layer.

17. The pointing, acquisition, and tracking system of claim 16, wherein the second optical receiver is the beacon detector.

18. The pointing, acquisition, and tracking system of claim 14, wherein the pointing, acquisition, and tracking system does not include a fast steering mirror or any moving components in an optical path of the optical communication signal.

19. A method of aligning an optical communication signal from a remote source with an optical receiver on a mobile platform to receive the optical communication signal through an entrance aperture in a surface, the method comprising:

detecting with a camera an alignment beam from the remote source, substantially coincident with the optical communication signal, and reflected by a reflective layer in front of the surface;

determining, from the reflected alignment beam, alignment information about the alignment beam relative to the entrance aperture; and transmitting the alignment information to the remote source to enable the remote source to center the optical communication signal in the entrance aperture.

20. The method of claim 19, further comprising:

detecting with a beacon detector a beacon signal from the remote source; and adjusting, via a pivotable support mechanism, an orientation of the surface to be substantially perpendicular to a wavefront of the optical communication signal based on a direction of the remote source determined from the beacon signal.

* * * * *